United States Patent
Kumar S

(10) Patent No.: US 11,528,122 B1
(45) Date of Patent: Dec. 13, 2022

(54) APPARATUS, SYSTEM, AND METHOD FOR SYNCHRONIZING SLAVE CLOCKS WITH OPTIMAL MASTER CLOCKS IN PARTIAL TIMING NETWORKS

(71) Applicant: Juniper Networks, Inc., Sunnyvale, CA (US)

(72) Inventor: Satheesh Kumar S, Sunnyvale, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 79 days.

(21) Appl. No.: 17/177,589

(22) Filed: Feb. 17, 2021

(51) Int. Cl.
*H04L 7/00* (2006.01)
*H04L 45/00* (2022.01)

(52) U.S. Cl.
CPC .......... *H04L 7/0037* (2013.01); *H04L 45/20* (2013.01)

(58) Field of Classification Search
CPC ...... H04L 7/0037; H04L 45/20; H04W 84/18; H04W 12/06; H04W 12/50; H04W 84/20; H04B 1/7156
See application file for complete search history.

(56) References Cited

U.S. PATENT DOCUMENTS

| | | | | |
|---|---|---|---|---|
| 6,765,863 | B1* | 7/2004 | Wakimoto | H04L 45/12 714/2 |
| 8,954,609 | B1* | 2/2015 | Holleman | H04J 3/0667 709/227 |
| 9,819,541 | B2* | 11/2017 | Garg | H04L 45/20 |
| 11,197,224 | B1* | 12/2021 | Baker | H04W 28/021 |

* cited by examiner

Primary Examiner — Chandrahas B Patel
(74) Attorney, Agent, or Firm — FisherBroyles, LLP

(57) ABSTRACT

A method may include (1) preparing, at a slave device, a request message that identifies an initial time-to-live value, (2) sending the request message to a plurality of candidate master devices, (3) receiving, at the slave device from one of the candidate master devices, a reply message that identifies a number of hops between the slave device and the one of the candidate master devices, (4) receiving, at the slave device from another one of the candidate master devices, another reply message that identifies another number of hops between the slave device and the another one of the candidate master devices, and then (5) synchronizing a clock of the slave device with a clock of the one of the candidate master devices due at least in part to the number of hops being less than the another number of hops. Various other apparatuses, systems, and methods are also disclosed.

20 Claims, 11 Drawing Sheets

| Bits | | | | | | | | Octets | TLV Offset |
|---|---|---|---|---|---|---|---|---|---|
| 7 | 6 | 5 | 4 | 3 | 2 | 1 | 0 | | |
| TLVType | | | | | | | | 2 | 0 |
| LengthField | | | | | | | | 2 | 2 |
| MessageType | | | InitialTTL | | | | | 1 | 4 |
| LogInterMessagePeriod | | | | | | | | 1 | 5 |
| DurationField | | | | | | | | 4 | 6 |

| Bits | | | | | | | | Octets | Offset |
|---|---|---|---|---|---|---|---|---|---|
| 7 | 6 | 5 | 4 | 3 | 2 | 1 | 0 | | |
| Header | | | | | | | | 34 | 0 |
| OriginTimeStamp | | | | | | | | 10 | 34 |
| CurrentUTCOffset | | | | | | | | 2 | 44 |
| NumberOfHops | | | | | | | | 1 | 46 |
| GrandMasterPriority1 | | | | | | | | 1 | 47 |
| GrandMasterClockQuality | | | | | | | | 4 | 48 |
| GrandMasterPriority2 | | | | | | | | 1 | 52 |
| GrandMasterIdentity | | | | | | | | 8 | 53 |
| StepsRemoved | | | | | | | | 2 | 61 |
| TimeSource | | | | | | | | 1 | 63 |

APPARATUS, SYSTEM, AND METHOD FOR SYNCHRONIZING SLAVE CLOCKS WITH OPTIMAL MASTER CLOCKS IN PARTIAL TIMING NETWORKS

BACKGROUND

Computer networks often include certain devices that synchronize their internal clocks with one another. For example, a partial timing network may include and/or represent a combination of devices that support a certain clock-synchronization protocol, such as Precision Time Protocol (PTP), and devices that do not support the clock-synchronization protocol. In some conventional partial timing networks, PTP-aware slave devices may synchronize their clocks with one of various master devices via PTP-unaware devices in the network path. Such PTP-aware slave devices may implement and/or rely on a conventional Best Master Clock Algorithm (BMCA) to select one of those master devices for synchronization.

Unfortunately, the conventional BMCA may lead PTP-aware slave devices to select suboptimal master devices for synchronization in partial timing network. As a result, these slave devices and the selected master devices may be somewhat desynchronized and/or out-of-sync with respect to one another. Such desynchronization may potentially lead to certain inefficiencies, poor performance levels, and/or disfunctions across the partial timing network.

The instant disclosure, therefore, identifies and addresses a need for improved apparatuses, systems, and methods for synchronizing slave clocks with optimal master clocks in partial timing networks.

SUMMARY

As will be described in greater detail below, the instant disclosure generally relates to apparatuses, systems, and methods for synchronizing slave clocks with optimal master clocks in partial timing networks. In one example, a method for accomplishing such a task may include (1) preparing, at a slave device included in a partial timing network, at least one request message that identifies an initial time-to-live value, (2) sending the request message to a plurality of candidate master devices included in the partial timing network, (3) receiving, at the slave device from one of the candidate master devices, a reply message that identifies a number of hops between the slave device and the one of the candidate master devices, the number of hops having been calculated based at least in part on the initial time-to-live value, (4) receiving, at the slave device from another one of the candidate master devices, another reply message that identifies another number of hops between the slave device and the another one of the candidate master devices, the another number of hops having been calculated based at least in part on the initial time-to-live value, and then (5) synchronizing a clock of the slave device with a clock of the one of the candidate master devices due at least in part to the number of hops being less than the another number of hops.

Similarly, a system that implements the above-identified method may include a physical processor configured to execute various modules stored in memory on a network node within a network. In one example, this system may include and/or execute (1) a message module that prepares at least one request message that identifies an initial time-to-live value, (2) a transmission module that sends the request message from a slave device to a plurality of candidate master devices included in a partial timing network, (3) a receiving module that (A) receives, at the slave device from one of the candidate master devices, a reply message that identifies a number of hops between the slave device and the one of the candidate master devices, the number of hops having been calculated based at least in part on the initial time-to-live value, and (B) receives, at the slave device from another one of the candidate master devices, another reply message that identifies another number of hops between the slave device and the another one of the candidate master devices, the another number of hops having been calculated based at least in part on the initial time-to-live value, and (4) a synchronization module that synchronizes a clock of the slave device with a clock of the one of the candidate master devices due at least in part to the number of hops being less than the another number of hops.

Additionally or alternatively, an apparatus that implements the above-identified method may include at least one storage device that stores an initial time-to-live value. The apparatus may also include at least one physical processor communicatively coupled to the storage device. In one example, the physical processor may (1) prepare, at a slave device included in a partial timing network, at least one request message that identifies an initial time-to-live value, (2) send the request message to a plurality of candidate master devices included in the partial timing network, (3) receive, at the slave device from one of the candidate master devices, a reply message that identifies a number of hops between the slave device and the one of the candidate master devices, the number of hops having been calculated based at least in part on the initial time-to-live value, (4) receive, at the slave device from another one of the candidate master devices, another reply message that identifies another number of hops between the slave device and the another one of the candidate master devices, the another number of hops having been calculated based at least in part on the initial time-to-live value, and then (5) synchronize a clock of the slave device with a clock of the one of the candidate master devices due at least in part to the number of hops being less than the another number of hops.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
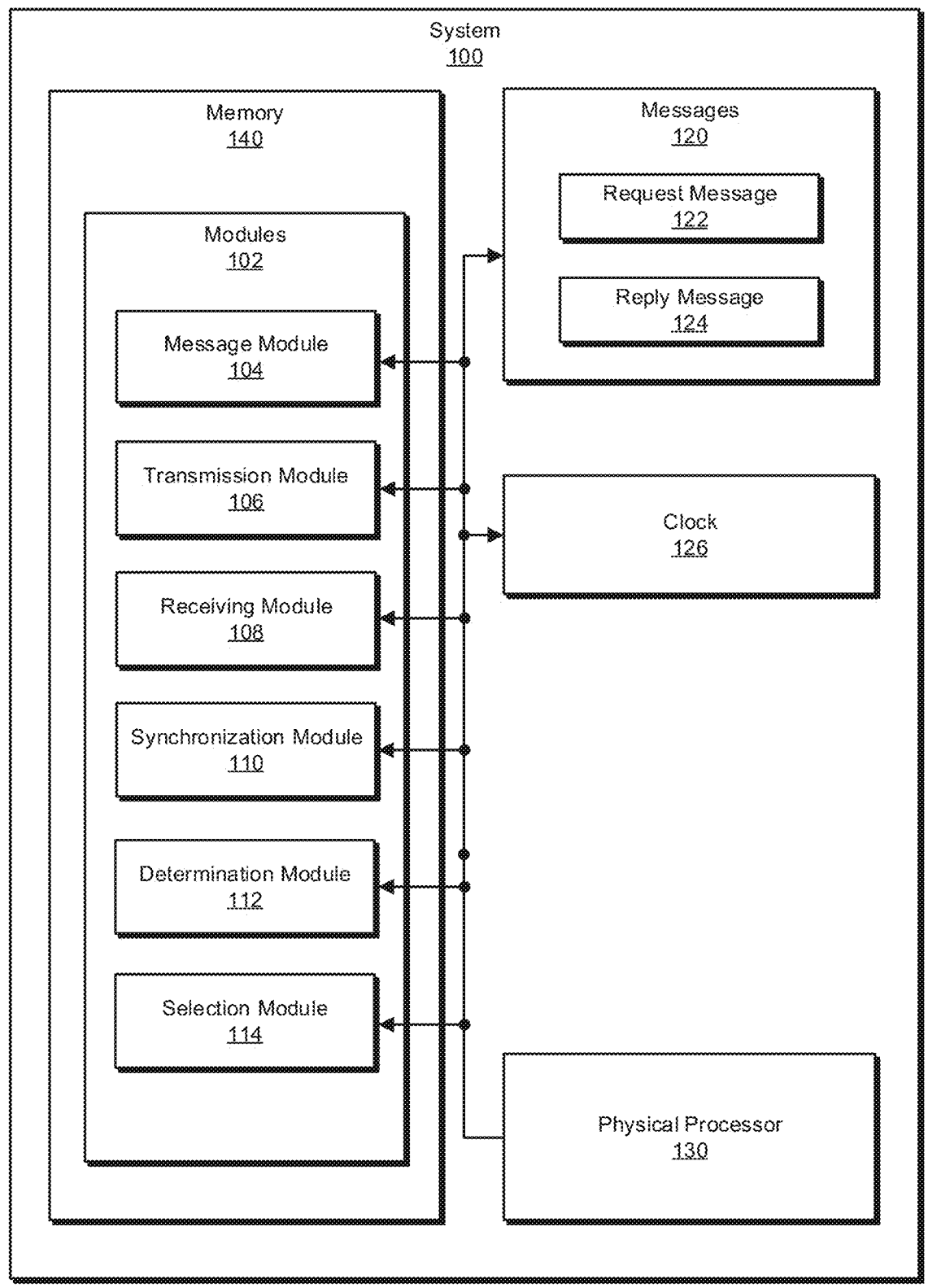
FIG. 1 is a block diagram of an exemplary system for synchronizing slave clocks with optimal master clocks in partial timing networks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for synchronizing slave clocks with optimal master clocks in partial timing networks. As will be explained in greater detail below, embodiments of the instant disclosure may involve co-opting, appropriating, and/or repurposing a reserved data field within a request message (e.g., a PTP request-announce message) for carrying an initial Time-To-Live (TTL) value. For example, a slave device included in a partial timing network may generate a PTP request-announce message that includes an initial TTL value within a traditionally reserved data field. In this example, the slave device may send the PTP request-announce message to multiple master devices included in the partial timing network. The initial TTL value may indicate and/or reflect the value of another TTL feature included in and/or carried by the request message upon egressing the slave device.

As the PTP request-announce message traverses across one or more intermediary devices included in the partial timing network on the way to one of the master devices, the intermediary devices may decrement the other TTL feature included in and/or carried by the request message. Upon receiving the PTP request-announce message, the destination master device may locate and/or identify the initial TTL value and the other TTL feature within the PTP request-announce message. The master device may calculate the number of hops that separate the slave device and the master device by subtracting the value of the other TTL feature from the initial TTL value.

In response to the PTP request-announce message, the master device may generate a PTP announce message that identifies the number of hops that separate the slave device and the master device. The master device may then send the PTP announce message to the slave device via the partial timing network. Upon receiving the PTP announce message, the slave device may locate and/or identify the number of hops that separate the slave device and the master device within the PTP announce message. The slave device may repeat this PTP messaging sequence with some of the other master devices included in the partial timing network.

In one example, the slave device may compare the differing numbers of hops that separate the slave device and the multiple master devices included in the partial timing network. In this example, the slave device may select the master device that is separated from the slave device by the lowest number of hops. The slave device may then synchronize its internal clock with the internal clock of the selected master device.

In another example, the slave device may calculate candidate scores for each of the master devices available for synchronization within the partial timing network. In this example, each candidate score may represent a sum of the number of hops separating one of the master devices from the slave device and the number of PTP-aware hops that separate that master device from a grand master device included in the partial timing network. The slave device may compare these candidate scores with one another and then select the master device with the lowest candidate score. The slave device may then synchronize its internal clock with the internal clock of the selected master device.

Embodiments of the instant disclosure may enable slave devices to synchronize with optimal master devices in partial timing networks. Such embodiments may enable the slave device and/or the partial timing network as a whole to avoid certain inefficiencies, poor performance levels, and/or disfunctions experienced by PTP technologies that implement a conventional BMCA. Accordingly, such embodiments may improve the performance and/or functionality of the slave device and/or the partial timing network over PTP technologies that implement a conventional BMCA.

The following will provide, with reference to FIGS. 1-9 detailed descriptions of exemplary apparatuses, systems, components, and corresponding implementations for synchronizing slave clocks with optimal master clocks in partial timing networks. Detailed descriptions of computer-implemented methods for synchronizing slave clocks with optimal master clocks in partial timing networks will be provided in connection with FIG. 10. In addition, detailed descriptions of an exemplary computing system for carrying out these methods will be provided in connection with FIG. 11.

FIG. 1 shows an exemplary system 100 that facilitates synchronizing slave clocks with optimal master clocks in partial timing networks. As illustrated in FIG. 1, system 100 may include one or more modules 102 for performing one or more tasks. As will be explained in greater detail below, modules 102 may include a message module 104, a transmission module 106, a receiving module 108, a synchronization module 110, a determination module 112, and a selection module 114. Although illustrated as separate elements, one or more of modules 102 in FIG. 1 may represent portions of a single module, application, and/or operating system.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., network nodes 202, 206, 208, 210(1)-(N), and/or 212(1)-(N)), the devices illustrated in FIGS. 3 and 4 (e.g., slave device 302, grand master device 310, candidate master devices 304, 306, and 308, and PTP-unaware devices 312, 314, and 316), the devices illustrated in FIG. 5 (e.g., slave device 502, candidate master devices 504 and 506, and PTP-unaware devices 512, 514, 516, and 518) and/or the devices illustrated in FIG. 11 (e.g., computing system 1100). One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate synchronizing slave clocks with optimal master clocks in partial timing networks. Examples of physical processor 130 include, without limitation, Central Processing Units (CPUs), microprocessors, microcontrollers, Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may further include one or more messages, such as messages 120. In some examples, messages 120 may include and/or represent a request message 122 and/or a reply message 124. In one example, request message 122 may include and/or represent various fields of data that facilitate and/or support selecting a master device and/or coordinating a synchronization operation between a slave device and the master device. For example, request message 122 may include and/or contain a data field that identifies an initial TTL value. In this example, the initial TTL value may indicate and/or reflect the value of another TTL feature included in and/or carried by request message 122 upon egressing the slave device.

In one example, reply message 124 may include and/or represent various fields of data that facilitate and/or support selecting a master device and/or coordinating the synchronization operation between the slave device and the master device. For example, reply message 124 may include and/or contain a data field that identifies the number of total hops (e.g., PTP-aware and PTP-unaware devices) located between the master device and the slave device. In addition, reply message 124 may include and/or contain another data field that identifies the number of PTP-aware hops located between the master device and a grand master device.

As illustrated in FIG. 1, exemplary system 100 may additionally include one or more clocks, such as clock 126. In some examples, clock 126 may run and/or operate in a slave device included in a partial timing network. In such examples, clock 126 may include and/or represent a slave-only clock capable of being synchronized with a master clock of a master device.

In other examples, clock 126 may run and/or operate in a master device included in the partial timing network. In such examples, clock 126 may provide and/or facilitate master and/or slave synchronization capabilities in connection with the partial timing network. In further examples, clock 126 may run and/or operate in a grand master device included in the partial timing network. In such examples, clock 126 may provide and/or facilitate master-only synchronization capabilities in connection with the partial timing network.

Figure 2:
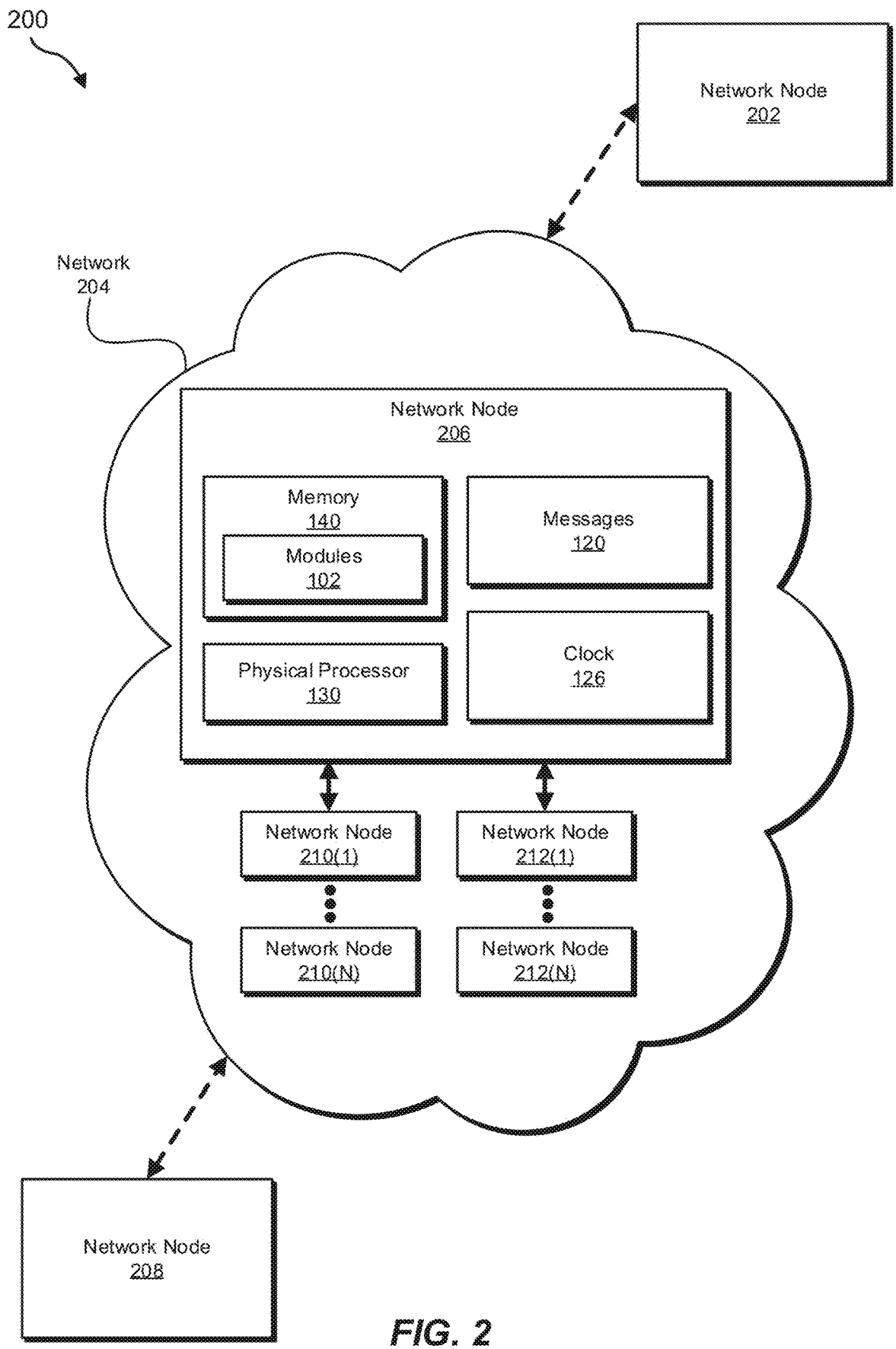
FIG. 2 is a block diagram of an additional exemplary system for synchronizing slave clocks with optimal master clocks in partial timing networks.

An apparatus for synchronizing slave clocks with optimal master clocks in partial timing networks may include all or portions of exemplary system 100. In some examples, system 100 in FIG. 1 may be implemented in a variety of ways. For example, all or a portion of exemplary system 100 may represent portions of exemplary system 200 in FIG. 2. As shown in FIG. 2, system 200 may include a network 204 that facilitates communication among network node 206, network nodes 210(1)-(N), network nodes 212(1)-(N), network node 202, and/or network node 208.

As illustrated in FIG. 2, network 204 may include and/or represent various network devices and/or nodes that form and/or establish communication paths and/or segments. For example, network 204 may include a network node 206 that forwards traffic from network node 202 along one or more active paths toward network node 208. In this example, an active path may include and/or represent network nodes 210(1)-(N), and another active path may include and/or represent network nodes 212(1)-(N).

In some embodiments, each of network nodes 202, 206, 208, 210(1)-(N), and/or 212(1)-(N) may include and/or represent an instance of memory 140, an instance of physical processor 130, and/or an instance of clock 126. In one example, and as will be described in greater detail below, one or more of modules 102 may cause network node 206 to (1) prepare request message 122 that identifies an initial time-to-live value, (2) send request message 122 to a plurality of candidate master devices included in network 204, (3) receive, from one of the candidate master devices, reply message 124 that identifies the number of hops between network node 206 and that candidate master device, the number of hops having been calculated by that candidate master device based at least in part on the initial time-to-live value, (4) receiving, from another one of the candidate master devices, another reply message that identifies number of hops between network node 206 and that other candidate master device, the number of hops having been calculated by that other candidate master device based at least in part on the initial time-to-live value, and then (5) synchronizing clock 126 of network node 206 with a clock of the optimal candidate master device due at least in part to the optimal candidate master device being separated from network node 206 by the least number of hops.

Network nodes 202, 206, 208, 210(1)-(N), and/or 212(1)-(N) each generally represent any type or form of physical computing device capable of reading computer-executable instructions, handling network traffic, and/or synchronizing internal clocks with one another. In one example, network nodes 202, 206, 208, 210(1)-(N), and/or 212(1)-(N) may each include and/or represent a router (such as a transit label switching router, a label edge router, a provider edge router, a hub router, a spoke router, an autonomous system boundary router, and/or an area border router). Additional examples of network nodes 202, 206, 208, 210(1)-(N), and/or 212(1)-(N) include, without limitation, PTP-aware devices, PTP-unaware devices, slave devices, master devices, grand master devices, switches, hubs, modems, bridges, repeaters, gateways (such as Broadband Network Gateways (BNGs)), multiplexers, network adapters, network interfaces, linecards, collectors, client devices, laptops, tablets, desktops, servers, cellular phones, Personal Digital Assistants (PDAs), multimedia players, embedded systems, wearable devices, gaming consoles, portions of one or more of the same, variations or combinations of one or more of the same, and/or any other suitable devices.

Network 204 generally represents any medium and/or architecture capable of facilitating communication, data transfer, and/or distribution of efficient clock advertisements. In one example, network 204 may include any or all of network nodes 202, 206, 208, 210(1)-(N), and/or 212(1)-(N) even though some of these devices are illustrated as being external to network 204 in FIG. 2. Additionally or alternatively, network 204 may include other devices that facilitate communication among network nodes 202, 206, 208, 210(1)-(N), and/or 212(1)-(N). Network 204 may facilitate communication or data transfer using wireless and/or wired connections. Examples of network 204 include, without limitation, a PTP network, a partial timing network, an intranet, an access network, a layer 3 network, an MPLS network, an Internet Protocol (IP) network, a heterogeneous network (e.g., layer 2, layer 3, IP, and/or MPLS) network, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 10:
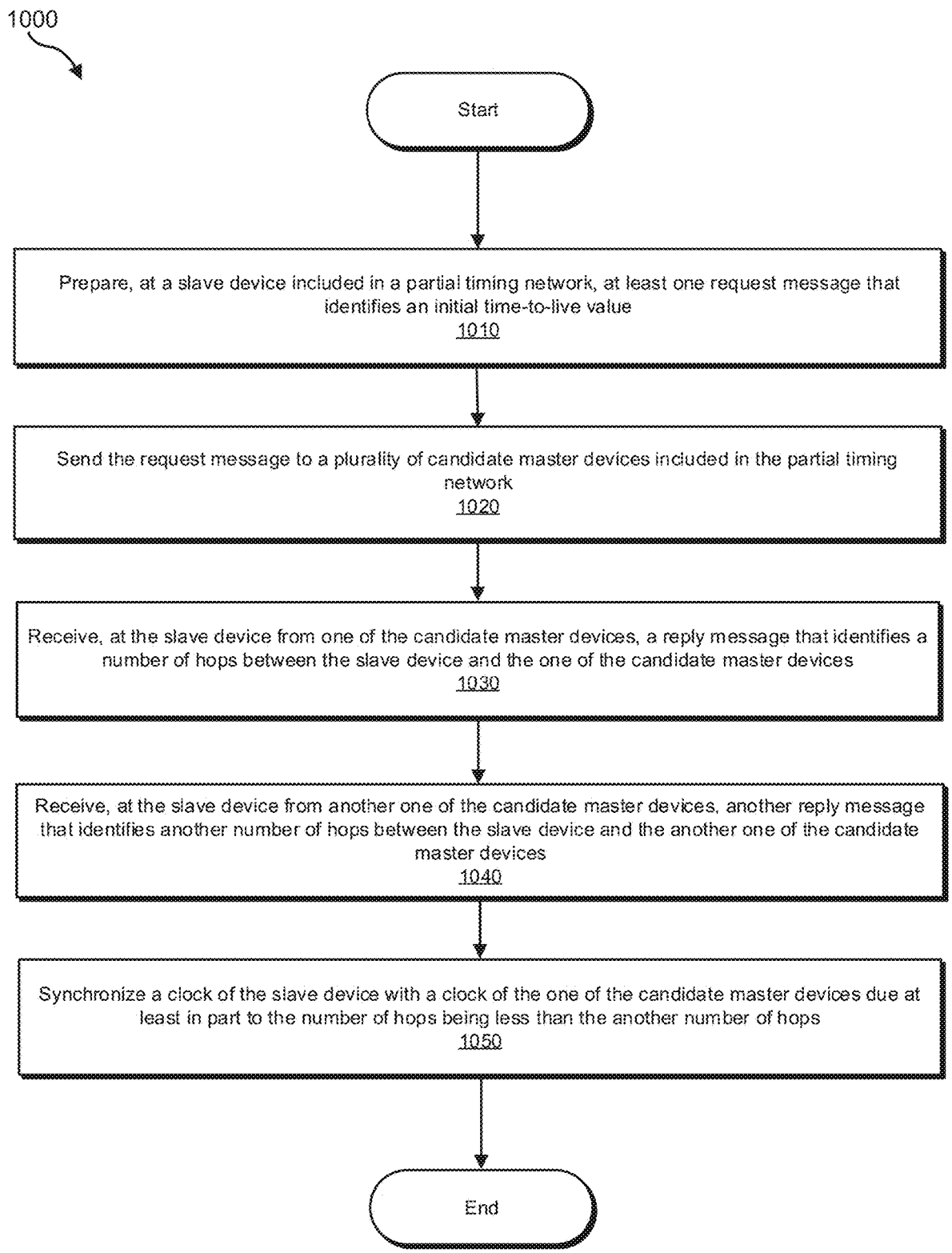
FIG. 10 is a flow diagram of an exemplary method for synchronizing slave clocks with optimal master clocks in partial timing networks.

FIG. 10 is a flow diagram of an exemplary computer-implemented method 1000 for synchronizing slave clocks with optimal master clocks in partial timing networks. The steps shown in FIG. 10 may be performed by any suitable computer-executable code and/or computing system, including system 100 in FIG. 1, system 200 in FIG. 2, partial timing network 300 in FIG. 3, partial timing network 400 in FIG. 4, partial timing network 500 in FIG. 5, system 1100 in FIG. 11, and/or variations or combinations of one or more of the same. In addition, the steps shown in FIG. 10 may be performed by any suitable node, device, and/or component included in system 100 in FIG. 1, system 200 in FIG. 2, partial timing network 300 in FIG. 3, partial timing network 400 in FIG. 4, partial timing network 500 in FIG. 5, system 1100 in FIG. 11, and/or the like. In one example, each of the steps shown in FIG. 10 may represent an algorithm whose structure includes and/or is represented by multiple substeps, examples of which will be provided in greater detail below.

As illustrated in FIG. 10, at step 1010 one or more of the systems described herein may prepare, at a slave device included in a partial timing network, at least one request message that identifies an initial TTL value. For example, message module 104 may, as part of network node 206 in FIG. 2, prepare request message 122 that identifies an initial TTL value. In this example, request message 122 may include and/or represent a PTP request-announce message designed and/or intended to trigger and/or prompt the transmission of a corresponding announce message from one or more of candidate master devices included in network 204.

The systems described herein may perform step 1010 in a variety of ways and/or contexts. In some examples, message module 104 may generate and/or create request message 122 for transmission via network 204. In one example, message module 104 may populate request message 122 with data indicative and/or representative of an initial TTL value for request message 122. In this example, the initial TTL value may indicate and/or reflect the value of another TTL feature included in and/or carried by request message 122 upon egressing network node 206. For example, the initial TTL value may indicate and/or reflect the value of an Internet Protocol (IP) TTL value (e.g., an IPv4 or IPv6 TTL value) included in and/or carried by request message 122 upon egressing network node 206. However, unlike the IP TTL value, the initial TTL value may remain constant, without decrementing, as request message 122 crosses and/or traverses network 204 toward its destination.

Figure 6:
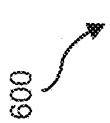
FIG. 6 is an illustration of an exemplary request message that identifies an initial time-to-live value.

FIG. 6 illustrates an exemplary format 600 of request message 122. As illustrated in FIG. 6, exemplary format 600 of request message 122 may include and/or represent a certain structure and/or organization of various data fields. In some examples, these data fields may include and/or represent a sequence of bits that constitute and/or form at least a portion of one or more octets and/or bytes. In such examples, these data fields may be positioned, placed, and/or located at certain offsets (relative to, e.g., a starting point) within request message 122.

In one example, format 600 may call for the initial TTL value to occupy four bits positioned, placed, and/or located at an offset of four within the request message. In this example, the initial TTL value may occupy a position and/or data field that has traditionally been reserved and/or off-limits. Accordingly, network node 206 may implement a PTP scheme and/or policy that involves coopting, appropriating, and/or repurposing a traditionally reserved data field within request message 122 for carrying an initial TTL value.

As illustrated in FIG. 10, at step 1020 one or more of the systems described herein may send the request message to a plurality of candidate master devices included in the partial timing network. For example, transmission module 106 may, as part of network node 206 in FIG. 2, send request message 122 to one or more of network nodes 202, 208, 210(1)-(N), and 212(1)-(N) included in network 204. In this example, one instance of request message 122 may be destined for and/or traverse across network 204 to each candidate master device included and/or represented among those network nodes. Additionally or alternatively, multiple instances of request message 122 may collectively be destined for and/or traverse across network 204 to the candidate master devices included and/or represented among those network nodes.

The systems described herein may perform step 1020 in a variety of ways and/or contexts. In some examples, transmission module 106 may direct network node 206 to transmit request message 122 to one or more of the candidate master devices included in network 206. In such examples, request message 122 may traverse and/or pass through various paths within network 206 to reach such destinations.

Figure 3:
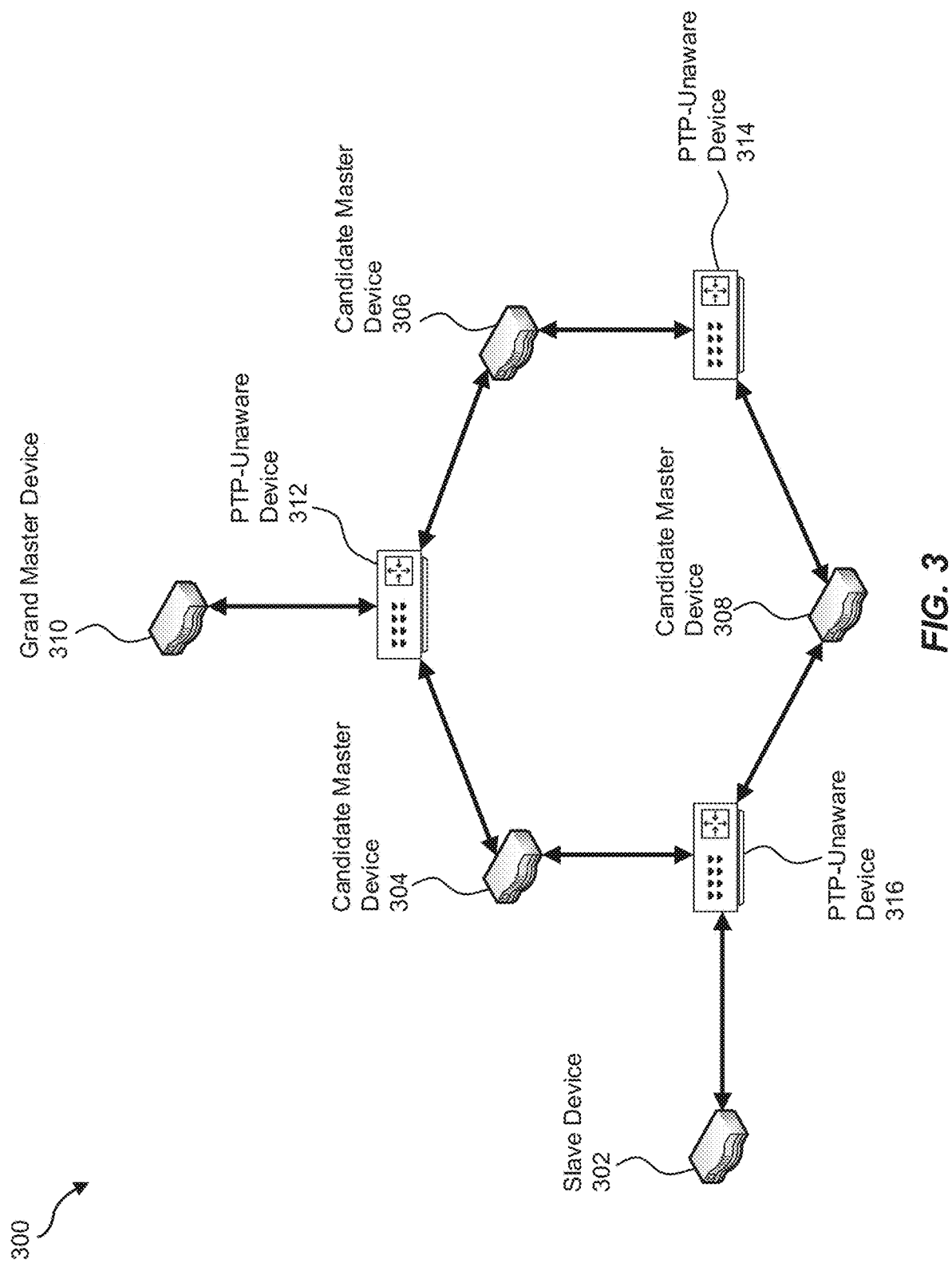
FIG. 3 is a block diagram of an exemplary partial timing network that includes devices capable of facilitating the synchronization of a slave clock with an optimal master clock.

FIG. 3 illustrates an exemplary partial timing network 300 that includes and/or represents a slave device 302, candidate master devices 304, 306, and 308, PTP-unaware devices 312, 314, and 316, and a grand master device 310. As illustrated in FIG. 3, exemplary partial timing network 300 may include various links that facilitate communication among slave device 302, candidate master devices 304, 306, and 308, PTP-unaware devices 312, 314, and 316, and grand master device 310. In some examples, PTP-unaware device 312 may be communicatively coupled to and/or between candidate master device 304, candidate master device 306, and grand master device 310 via different links. In such examples, PTP-unaware device 314 may be communicatively coupled to and/or between candidate master device 306 and candidate master device 308 via additional links. Additionally or alternatively, PTP-unaware device 316 may be communicatively coupled to and/or between slave device 302, candidate master device 304, and candidate master device 306 via further links.

In one example, slave device 302 may send request message 122 to candidate master device 304 via PTP-unaware device 316. For example, request message 122 may traverse and/or pass from slave device 302 to PTP-unaware device 316. Request message 122 may then traverse and/or pass from PTP-unaware device 316 to candidate master device 304.

Additionally or alternatively, slave device 302 may send request message 122 to candidate master device 308 via PTP-unaware device 316. For example, request message 122 may traverse and/or pass from slave device 302 to PTP-unaware device 316. Request message 122 may then traverse and/or pass from PTP-unaware device 316 to candidate master device 308.

In another example, slave device 302 may send request message 122 to candidate master device 306 via PTP-unaware device 316, candidate master device 308, and PTP-unaware device 314. For example, request message 122 may traverse and/or pass from slave device 302 to PTP-unaware device 316. Request message 122 may then traverse and/or pass from PTP-unaware device 316 to candidate master device 308. Request message 122 may subsequently traverse and/or pass from candidate master device 308 to PTP-unaware device 314. Finally, request message 122 may traverse and/or pass from PTP-unaware device 314 to candidate master device 306.

In some examples, each of these candidate master devices may receive an instance of request message 122 sent by slave device 302. As a specific example, upon receiving request message 122, candidate master device 304 may search request message 122 for the initial TTL value and/or another TTL feature (e.g., an IPv4 or IPv6 TTL value). During this search, candidate master device 304 may find and/or identify the initial TTL value and/or the additional TTL feature. In this example, the initial TTL value may have remained constant at sixty-four, without decrementing at all, during the journey of request message 122 from slave device 302 to candidate master device 304. However, unlike the initial TTL value, the other TTL feature may have decremented from sixty-four to sixty-two during the journey of request message 122 from slave device 302 to candidate master device 304.

Continuing with this example, candidate master device 304 may calculate the number of hops between slave device 302 and candidate master device 304 by subtracting the value of the other TTL feature from the initial TTL value. For example, candidate master device 304 may determine that slave device 302 is two hops away from candidate master device 304 by subtracting the other TTL value of sixty-two from the initial TTL value of sixty-four. Candidate master device 304 may then generate and/or prepare reply message 124 to send back to slave device 302. In one example, reply message 124 may include and/or represent a PTP announce message designed and/or intended to inform slave device 302 about certain parameters and/or characteristics capable of influencing the selection of a master clock by slave device 302.

In one example, candidate master device 304 may send reply message 124 to slave device 302 via PTP-unaware device 316. For example, reply message 124 may traverse and/or pass from candidate master device 304 to PTP-unaware device 316. Reply message 124 may then traverse and/or pass from PTP-unaware device 316 to slave device 302.

Additionally or alternatively, candidate master device 308 may send reply message 124 to slave device 302 via PTP-unaware device 316. For example, reply message 124 may traverse and/or pass from candidate master device 308 to PTP-unaware device 316. Reply message 124 may then traverse and/or pass from PTP-unaware device 316 to slave device 302.

In another example, candidate master device 306 may send reply message 124 to slave device 302 via PTP-unaware device 314, candidate master device 308, and PTP-unaware device 316. For example, reply message 124 may traverse and/or pass from candidate master device 306 to PTP-unaware device 314. Reply message 124 may then traverse and/or pass from PTP-unaware device 314 to candidate master device 308. Reply message 124 may subsequently traverse and/or pass from candidate master device 308 to PTP-unaware device 316. Finally, reply message 124 may traverse and/or pass from PTP-unaware device 316 to slave device 302.

As illustrated in FIG. 10, at step 1030 one or more of the systems described herein may receive, at the slave device from one of the candidate master devices, a reply message that identifies the number of hops between the slave device and the one of the candidate master devices. For example, receiving module 108 may, as part of network node 206 in FIG. 2, receive reply message 124 that identifies the number of hops between network node 206 and the destination of one instance of request message 122. This number of hops may be calculated by the destination based at least in part on the initial TTL value. In this example, reply message 124 may include and/or represent a PTP announce message designed and/or intended to be used by network node 206 in the construction of a clock hierarchy and/or in the selection of a master clock.

The systems described herein may perform step 1030 in a variety of ways and/or contexts. In some examples, receiving module 108 may monitor network node 206 for reply messages incoming and/or originating from one or more of the candidate master devices included in network 206. In one example, while monitoring network node 206 in this way, receiving module 108 may detect and/or receive reply message 124 as it arrives at network node 206. In this example, reply message 124 may traverse and/or pass through various paths within network 206 to reach network node 206.

As illustrated in FIG. 10, at step 1040 one or more of the systems described herein may receive, at the slave device from another one of the candidate master devices, another reply message that identifies the number of hops between the slave device and the one of the candidate master devices. For example, receiving module 108 may, as part of network node 206 in FIG. 2, receive another instance of reply message 124 that identifies the number of hops between network node 206 and the destination of another instance of request message 122. This number of hops may be calculated by the destination based at least in part on the initial TTL value. In this example, one instance of reply message 124 may arrive and/or originate from each candidate master device included and/or represented among network nodes 202, 208, 210(1)-(N), and 212(1)-(N).

The systems described herein may perform step 1040 in a variety of ways and/or contexts. In some examples, and as described above in connection with step 1030, receiving module 108 may monitor network node 206 for reply messages incoming and/or originating from one or more of the candidate master devices included in network 206. In one example, while monitoring network node 206 in this way, receiving module 108 may detect and/or receive the other instance of reply message 124 as it arrives at network node 206. In this example, the other instance of reply message 124 may traverse and/or pass through various paths within network 206 to reach network node 206.

Figure 4:
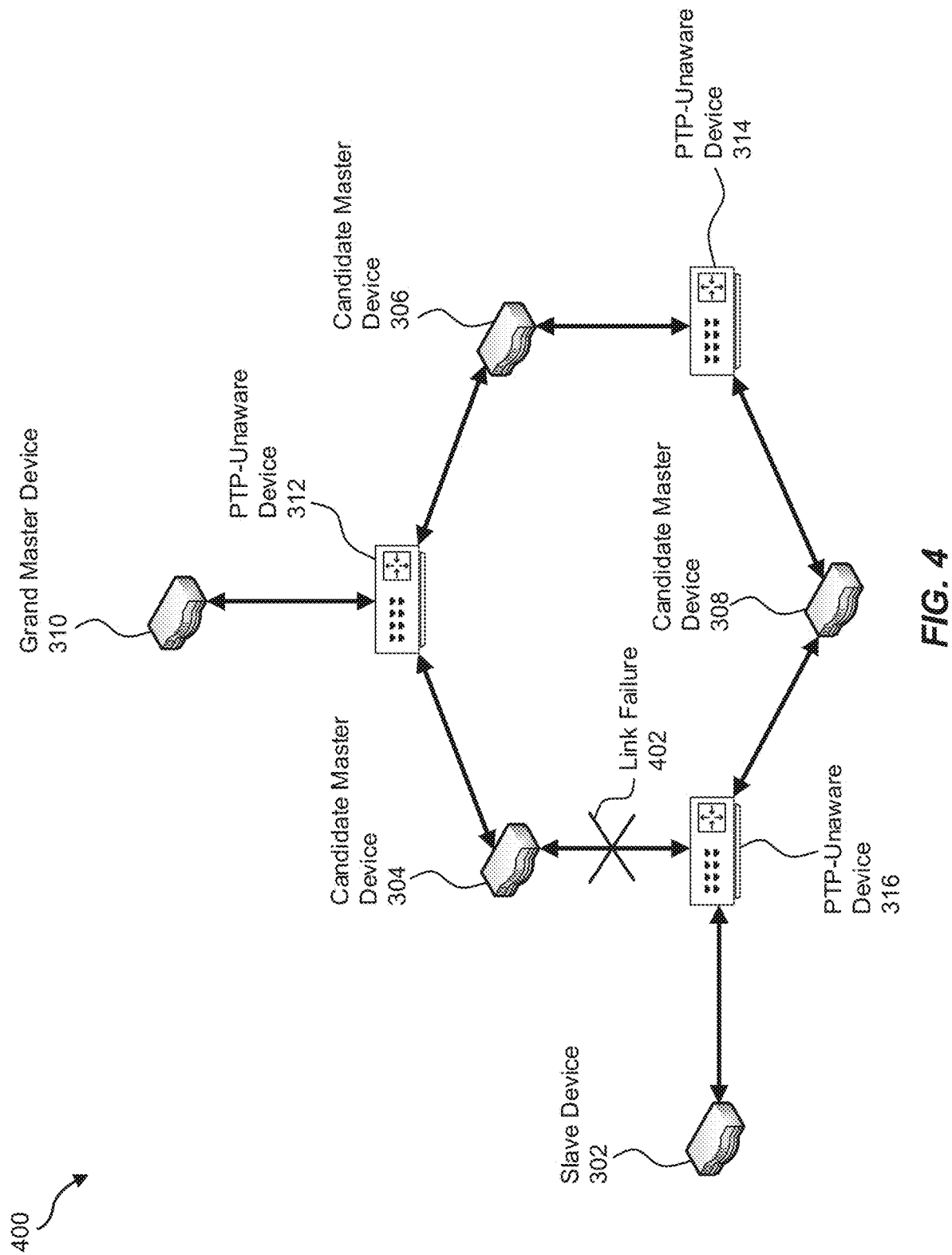
FIG. 4 is a block diagram of an additional exemplary partial timing network that includes devices capable of facilitating the synchronization of a slave clock with an optimal master clock.

FIG. 4 illustrates an exemplary partial timing network 400 that includes and/or represents slave device 302, candidate master devices 304, 306, and 308, PTP-unaware devices 312, 314, and 316, and grand master device 310. As illustrated in FIG. 4, and like partial timing network 300 in FIG. 3, exemplary partial timing network 400 may include various links that facilitate communication among slave device 302, candidate master devices 304, 306, and 308, PTP-unaware devices 312, 314, and 316, and grand master device 310. However, unlike partial timing network 300 in FIG. 3, partial timing network 400 may include and/or experience a link failure 402 between candidate master device 304 and PTP-unaware device 316.

In some examples, link failure 402 may prevent and/or limit traffic, advertising, or communications from being exchanged directly between candidate master device 304 and PTP-unaware device 316. In such examples, instead of being exchanged directly between candidate master device 304 and PTP-unaware device 316, such traffic, advertising, or communications may be exchanged between candidate master device 304 and PTP-unaware device 316 via candidate master device 308, PTP-unaware device 314, candidate master device 306, and PTP-unaware device 312. Accordingly, link failure 402 may change, alter, and/or modify the number of hops that separate slave device 302 and candidate master device 304 from one another. In one example, link failure 402 may occur and/or take place within partial timing network 400 before or after the scenario illustrated as partial timing network 300 in FIG. 3.

In one example, slave device 302 may send request message 122 to candidate master device 304 via PTP-unaware device 316, candidate master device 308, PTP-unaware device 314, candidate master device 306, and PTP-unaware device 312. For example, request message 122 may traverse and/or pass from slave device 302 to PTP-unaware device 316. Request message 122 may then traverse and/or pass from PTP-unaware device 316 to candidate master device 308. Request message 122 may subsequently traverse and/or pass from candidate master device 308 to PTP-unaware device 314. Request message 122 may further traverse and/or pass from PTP-unaware device 314 to candidate master device 306 and then from candidate master device 306 to PTP-unaware device 312. Finally, request message 122 may traverse and/or pass from PTP-unaware device 312 to candidate master device 304.

In one example, slave device 302 may send request message 122 to candidate master device 308 within partial timing network 400 in FIG. 4 in the same way described above in connection with partial timing network 300 in FIG. 3. Similarly, slave device 302 may send request message 122 to candidate master device 306 within partial timing network 400 in FIG. 4 in the same way described above in connection with partial timing network 300 in FIG. 3.

In some examples, and as described above in connection with partial timing network 300 in FIG. 3, each of these candidate master devices may receive an instance of request message 122 sent by slave device 302. As a specific example, upon receiving request message 122, candidate master device 304 may search request message 122 for the initial TTL value and/or another TTL feature (e.g., an IPv4 or IPv6 TTL value). During this search, candidate master device 304 may find and/or identify the initial TTL value and/or the additional TTL feature. In this example, the initial TTL value may have remained constant at sixty-four, without decrementing at all, during the journey of request message 122 from slave device 302 to candidate master device 304. However, unlike the initial TTL value, the other TTL feature may have decremented from sixty-four to fifty-eight during the journey of request message 122 from slave device 302 to candidate master device 304.

Continuing with this example, candidate master device 304 may calculate the number of hops between slave device 302 and candidate master device 304 by subtracting the value of the other TTL feature from the initial TTL value. For example, candidate master device 304 may determine that slave device 302 is six hops away from candidate master device 304 by subtracting the other TTL value of fifty-eight from the initial TTL value of sixty-four. Candidate master device 304 may then generate and/or prepare reply message 124 to send back to slave device 302. In this example, reply message 124 may include and/or contain data indicating that candidate master device 304 is six hops away from slave device 302. In some embodiments, reply message 124 may constitute and/or represent a PTP announce message designed and/or intended to inform slave device 302 about certain parameters and/or characteristics capable of influencing the selection of a master clock by slave device 302.

In one example, candidate master device 304 may send reply message 124 to slave device 302 via PTP-unaware device 312, candidate master device 306, PTP-unaware device 314, candidate master device 308, and PTP-unaware device 316. For example, reply message 124 may traverse and/or pass from candidate master device 304 to PTP-unaware device 312. Reply message 124 may then traverse and/or pass from PTP-unaware device 312 to candidate master device 306. Reply message 124 may subsequently traverse and/or pass from candidate master device 306 to PTP-unaware device 314. Reply message 124 may further traverse and/or pass from PTP-unaware device 314 to candidate master device 308 and then from candidate master device 308 to PTP-unaware device 316. Finally, reply message 124 may traverse and/or pass from PTP-unaware device 316 to slave device 302.

In one example, candidate master device 308 may send reply message 124 to slave device 302 within partial timing network 400 in FIG. 4 in the same way described above in connection with partial timing network 300 in FIG. 3. Similarly, candidate master device 306 may send reply message 124 to slave device 302 within partial timing network 400 in FIG. 4 in the same way described above in connection with partial timing network 300 in FIG. 3.

As illustrated in FIG. 10, at step 1050 one or more of the systems described herein may synchronizing a clock of the slave device with a clock of the one of the candidate master devices due at least in part to the number of hops being less than the other number of hops. For example, synchronization module 110 may, as part of network node 206 in FIG. 2, synchronize clock 126 of network node 206 with the clock of the candidate master device that is separated from network node 206 by the lowest number of hops. Additionally or alternatively, synchronizing module 110 may synchronize clock 126 of network node 206 with the clock of the candidate master device whose candidate score is lowest among all the candidate master devices. In one example, such a candidate score may constitute and/or represent a sum of the number of hops separating the corresponding candidate master device from network node 206 and the number of PTP-aware hops that separate that candidate master device from a grand master device (e.g., grand master device 310 in FIGS. 3 and 4).

The systems described herein may perform step 1050 in a variety of ways and/or contexts. In some examples, synchronization module 110 may align, square up, and/or match one or more timing features of clock 126 included on network node 206 with one or more corresponding timing features of the clock included on the selected master device. In one example, determination module 112 may, as part of network device 206, compare the number of hops that separate the candidate master devices from network device 206. In this example, determination module 112 may identify and/or determine which of those candidate master devices is separated from network node 206 by the lowest number of hops based at least in part on the comparison.

In response to this identification and/or determination, selection module 114 may, as part of network device 206, select the clock of the candidate master device that is separated from network node 206 by the lowest number of hops for synchronizing clock 126 of network device 206. In this example, synchronization module 114 may then synchronize clock 126 of network node 206 with the clock of the selected master device due at least in part to that master device being separated from network device 206 by the lowest number of hops among all the candidates.

In another example, determination module 112 may compare the candidate scores of all the candidate master devices included in network 204. For example, for each candidate master device, determination module 112 may add and/or sum up the number of hops separating the candidate master device from network device 206 and the number of PTP-aware hops separating the candidate master device from the grand master device. This addition and/or sum may constitute and/or represent the candidate score for the candidate master device. Accordingly, determination module 112 may calculate the candidate scores for the candidate master devices available for synchronization within network 204. In this example, determination module 112 may compare the candidates scores of the candidate master devices included in network 204. Determination module 112 may then identify and/or determine which of those candidate master devices has the lowest candidate score based at least in part on the comparison.

In response to this identification and/or determination, selection module 114 may select the clock of the candidate master device with the lowest candidate score for synchronizing clock 126 of network device 206. In this example, synchronization module 114 may then synchronize clock 126 of network node 206 with the clock of the selected master device due at least in part to that master device having the lowest candidate score among all the candidates.

Figure 7:
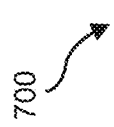
FIG. 7 is an illustration of an exemplary reply message that identifies the number of hops between a slave device and a candidate master device as well as the number of hops that support a certain clock-synchronization protocol (such as PTP) between that candidate master device and a grand master device.

FIG. 7 illustrates an exemplary format 700 of reply message 124. As illustrated in FIG. 7, exemplary format 700 of reply message 124 may include and/or represent a certain structure and/or organization of various data fields. In some examples, these data fields may include and/or represent a sequence of bits that constitute and/or form at least a portion of one or more octets and/or bytes. In such examples, these data fields may be positioned, placed, and/or located at certain offsets (relative to, e.g., a starting point) within reply message 124.

In one example, format 700 may call for data indicative of the number of hops separating the corresponding candidate master device from network node 206 to occupy eight bits positioned, placed, and/or located at an offset of forty-six within the reply message. In this example, the data indicative of the number of hops may occupy a position and/or data field that has traditionally been reserved and/or off-limits. Accordingly, the candidate master device may implement a PTP scheme and/or policy that involves coopting, appropriating, and/or repurposing a traditionally reserved data field within reply message 124 for carrying that data indicative of the number of hops.

In one example, format 700 may include and/or contain a data field that identifies the number of PTP-aware hops separating the candidate master device from the grand master device. For example, format 700 may include and/or contain a data field identified and/or labelled as steps removed. In this example, the data field identified and/or labelled as steps removed may include and/or occupy sixteen bits positioned, placed, and/or located at an offset of sixty-one within the reply message. This data filed identified and/or labelled as steps removed may indicate number of PTP-aware hops separating the candidate master device from the grand master device.

Figure 5:
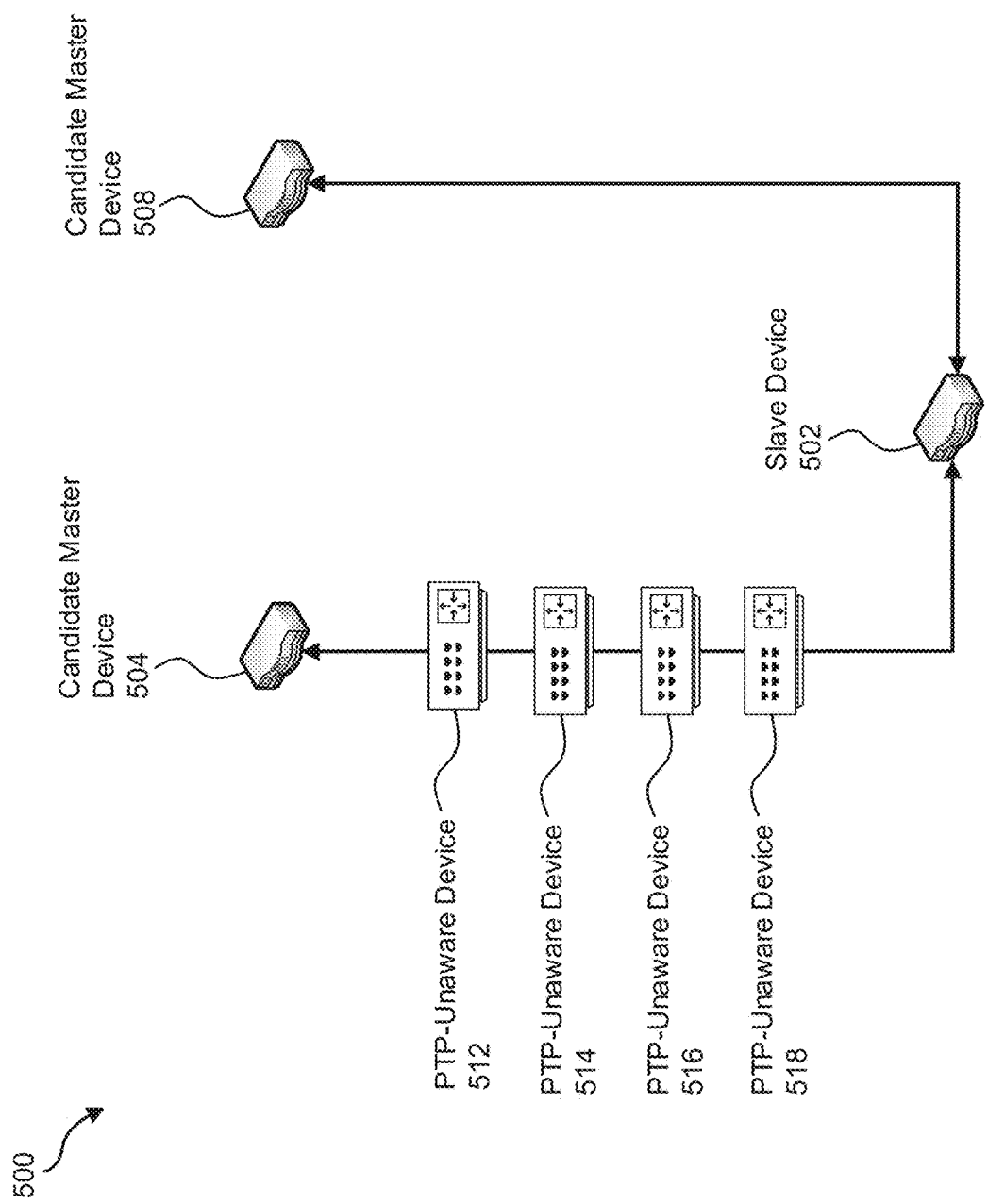
FIG. 5 is a block diagram of an additional exemplary system for synchronizing slave clocks with optimal master clocks in partial timing networks.

FIG. 5 illustrates an exemplary partial timing network 500 that includes and/or represents a slave device 502, candidate master devices 504 and 508, and PTP-unaware devices 512, 514, 516, and 518. As illustrated in FIG. 5, exemplary partial timing network 500 may include various links that facilitate communication among slave device 502, candidate master devices 504 and 508, and PTP-unaware devices 512, 514, 516, and 516. In some examples, PTP-unaware devices 512, 514, 516, and 516 may be communicatively coupled between candidate master device 504 and slave device 502 via different links. In such examples, candidate master device 508 and slave device 502 may be communicatively coupled directly to one another via an additional link.

In one example, slave device 502 may send PTP request-announce messages to both candidate master device 504 and candidate master device 508. In response to those PTP request-announce messages, candidate master devices 504 and 508 may send back PTP announce messages to slave device 502. In this example, slave device 502 may receive those PTP announce messages from candidate master devices 504 and 508 and then search those PTP announce messages for data fields that identify the number of hops separating the corresponding candidate master device from slave device 502 and the number of PTP-aware hops separating the corresponding candidate master device from the grand master device.

During this search, slave device 502 may find and/or identify those data fields. Slave device 502 may then identify and/or determine which of candidate master devices 504 and 508 is the best synchronization option based at least in part on the number of hops separating those candidate master devices from slave device 502. In one example, the best synchronization option may constitute and/or represent the candidate master device with the lowest degree of separation (e.g., the fewest hops) from slave device 502. In another example, the best synchronization option may constitute and/or represent the candidate master device with the lowest candidate score relative to slave device 502. In this example, each candidate score may correspond to and/or represent the sum of the number of hops separating the corresponding candidate master device from slave device 502 and the number of PTP-aware hops separating the corresponding candidate master device from the grand master device.

Figure 8:
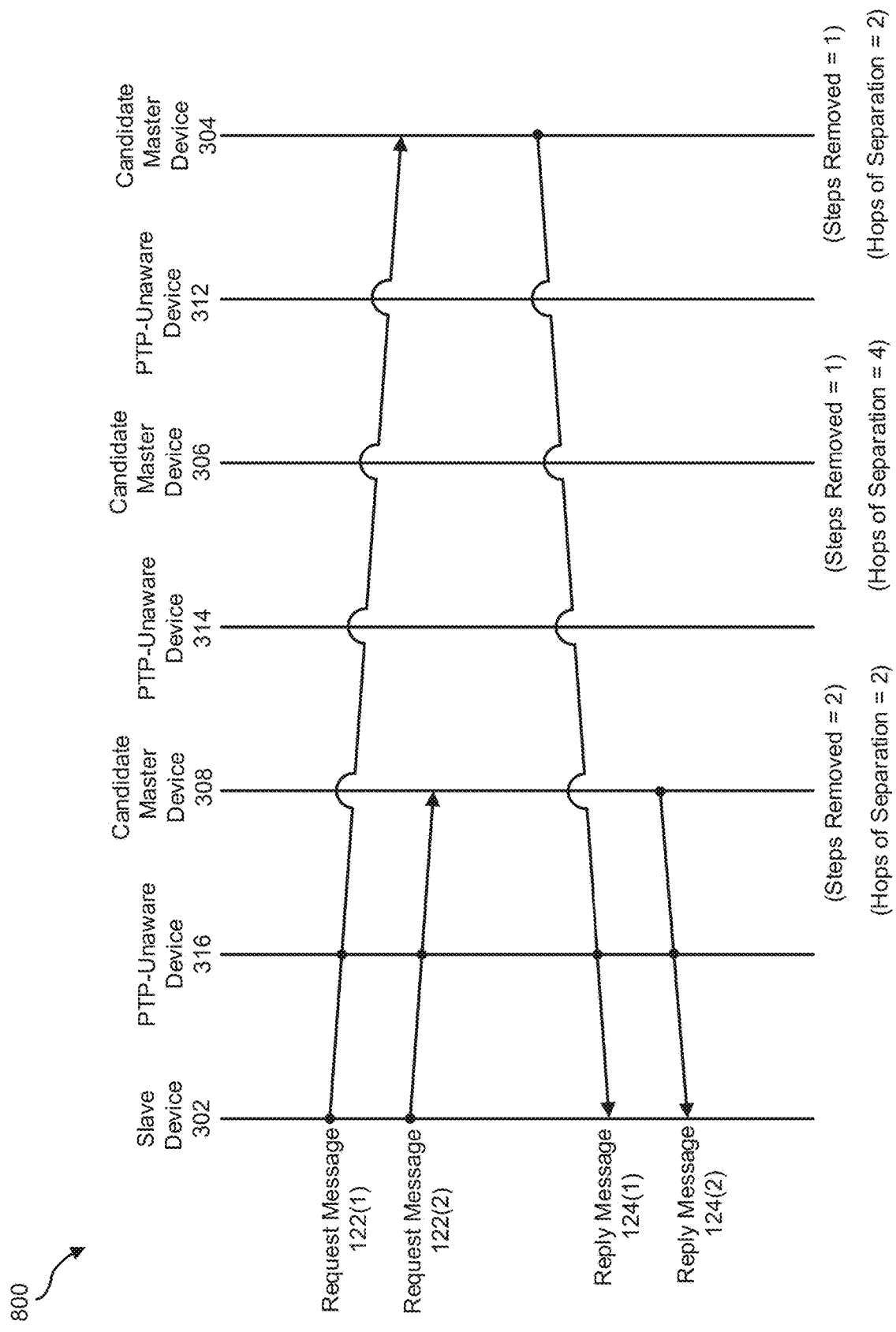
FIG. 8 is a timing diagram that illustrates an exemplary sequence of request and reply messages that traverse various devices included in a partial timing network before a certain link failure.

FIG. 8 illustrates an exemplary timing diagram 800 corresponding to partial timing network 300 in FIG. 3. As illustrated in FIG. 8, timing diagram 800 may involve and/or demonstrate slave device 302 in FIG. 3 transmitting a request message 122(1) to candidate master device 304 in FIG. 3 via PTP-unaware device 316 in FIG. 3. In this example, as partial timing network 300 in FIG. 3 includes a functional communication link between PTP-unaware device 316 and candidate master device 304, request message 122(1) may avoid traversing candidate master device 308 in FIG. 3, PTP-unaware device 314 in FIG. 3, candidate master device 306 in FIG. 3, and PTP-unaware device 312 in FIG. 3 on the way to candidate master device 304.

Continuing with this example, timing diagram 800 may involve and/or demonstrate slave device 302 transmitting a request message 122(2) to candidate master device 308 via PTP-unaware device 316. In response to request messages 122(1) and 122(2), candidate master devices 304 and 308 may transmit reply messages 124(1) and 124(2) back to slave device 302 via PTP-unaware device 316. In this example, reply message 124(1) may include one data field indicating that two hops currently separate candidate master device 304 from slave device 302 and another data field indicating that only one PTP-aware hop separates candidate master device 304 from grand master device 310. Similarly, reply message 124(2) may include one data field indicating that two hops currently separate candidate master device 308 from slave device 302 and another data field indicating that two PTP-aware hops separate candidate master 308 from grand master device 310.

In one example, slave device 302 may search reply messages 124(1) and 124(2) for data fields that identify the number of hops separating candidate master device 304 from slave device 302 and the number of hops separating candidate master device 308 from slave device 302. Additionally or alternatively, slave device 302 may search reply messages 124(1) and 124(2) for data fields that identify the number of PTP-aware hops separating candidate master device 304 from grand master device 310 and the number of PTP-aware hops separating candidate master device 308 from grand master device 310.

During this search, slave device 302 may find and/or identify those data fields in reply messages 124(1) and 124(2). For example, slave device 302 may determine that candidate master device 304 is separated from slave device 302 by two hops and/or that candidate master device 304 is one PTP-aware hop removed from grand master device 310. In this example, slave device 302 may also determine that candidate master device 308 is separated from slave device 302 by two hops and/or that candidate master device 308 is two PTP-aware hops removed from grand master device 310.

In some examples, slave device 302 may then identify and/or determine which of candidate master devices 304 and 308 is the best synchronization option based at least in part on the number of hops separating candidate master devices 304 and 308 from slave device 502. In one example, the best synchronization option may constitute and/or represent the candidate master device with the lowest degree of separation (e.g., the fewest hops) from slave device 302. In this example, slave device 302 may select either candidate master device 304 or 308 due at least in part to both of them having the same degree of separation. Slave device 302 may then synchronize its internal clock with the internal clock of the selected master device.

In another example, the best synchronization option may constitute and/or represent the candidate master device with the lowest candidate score relative to slave device 302. In this example, candidate master device 304 may have a candidate score of three (e.g., one step removed and two hops of separation), and candidate master device 308 may have a candidate score of four (e.g., two steps removed and two hops of separation). As a result, slave device 302 may select candidate master device 304 instead of candidate master device 308 due at least in part to candidate master device 304 having a lower candidate score than candidate master device 308. Slave device 302 may then synchronize its internal clock with the internal clock of the candidate master device 304.

Figure 9:
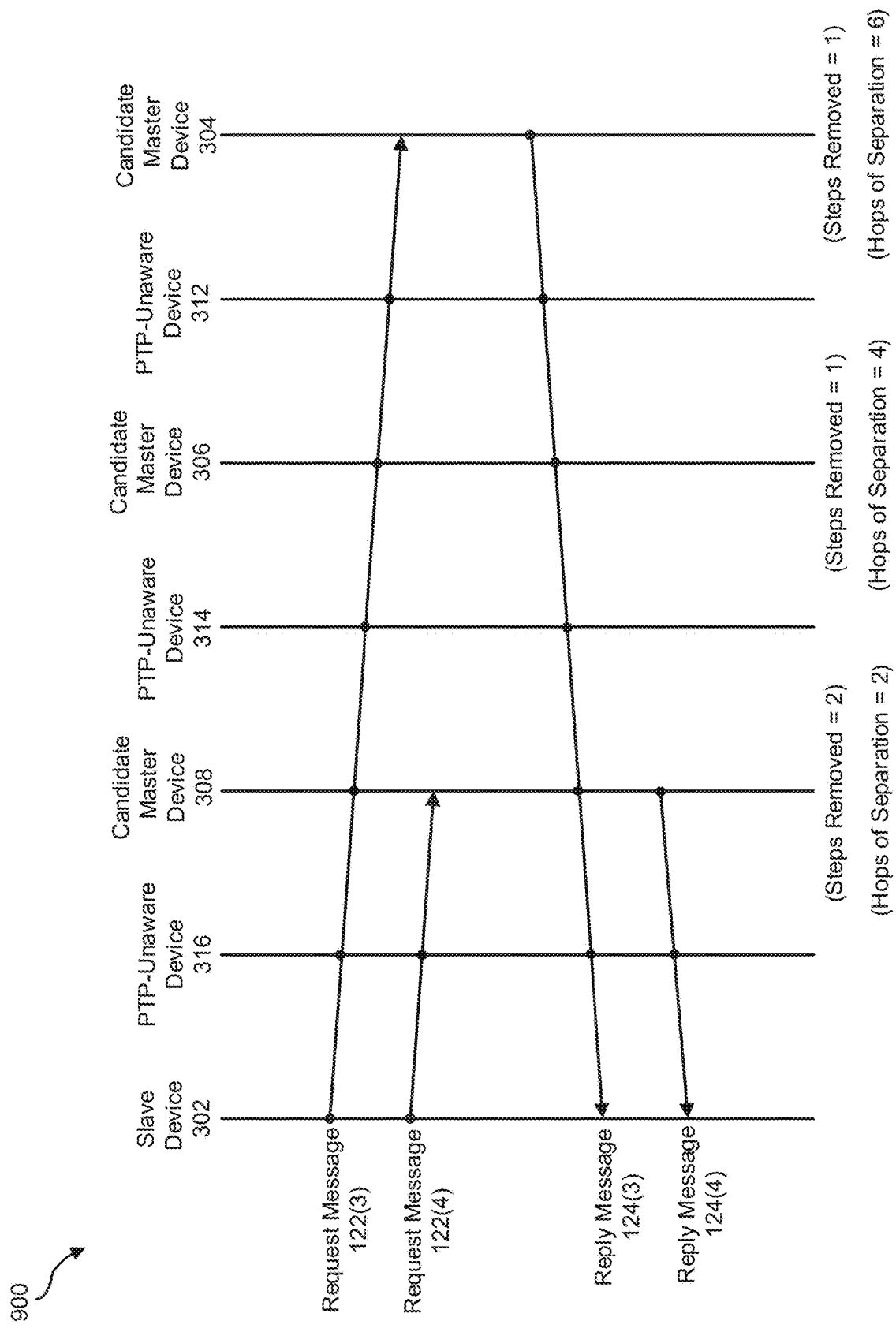
FIG. 9 is a timing diagram that illustrates an additional exemplary sequence of request and reply messages that traverse various devices included in a partial timing network after a certain link failure.

FIG. 9 illustrates an exemplary timing diagram 900 corresponding to partial timing network 400 in FIG. 4. As illustrated in FIG. 9, timing diagram 900 may involve and/or demonstrate slave device 302 in FIG. 4 transmitting a request message 122(3) to candidate master device 304 in FIG. 4 via PTP-unaware device 316 in FIG. 4, candidate master device 308 in FIG. 4, PTP-unaware device 314 in FIG. 4, candidate master device 306 in FIG. 4, and PTP-unaware device 312 in FIG. 4. In this example, as partial timing network 400 in FIG. 4 has suffered link failure 402 between PTP-unaware device 316 and candidate master device 304, request message 122(3) may need to traverse candidate master device 308, PTP-unaware device 314, candidate master device 306, and PTP-unaware device 312 to reach candidate master device 304.

Continuing with this example, timing diagram 900 may involve and/or demonstrate slave device 302 transmitting a request message 122(4) to candidate master device 308 via PTP-unaware device 316. In response to request message 122(4), candidate master device 308 may transmit reply message 124(4) back to slave device 302 via PTP-unaware device 316. However, in response to request message 122(4), candidate master device 304 may transmit reply message 124(4) back to slave device 302 via PTP-unaware device 312, candidate master device 306, PTP-unaware device 314, candidate master device 308, and PTP-unaware device 312.

In this example, reply message 124(3) may include one data field indicating that six hops currently separate candidate master device 304 from slave device 302 and another data field indicating that only one PTP-aware hop separates candidate master device 304 from grand master device 310. Similarly, reply message 124(4) may include one data field indicating that two hops currently separate candidate master device 308 from slave device 302 and another data field indicating that two PTP-aware hops separate candidate master 308 from grand master device 310.

In one example, slave device 302 may search reply messages 124(3) and 124(4) for data fields that identify the number of hops separating candidate master device 304 from slave device 302 and the number of hops separating candidate master device 308 from slave device 302. Additionally or alternatively, slave device 302 may search reply messages 124(3) and 124(4) for data fields that identify the number of PTP-aware hops separating candidate master device 304 from grand master device 310 and the number of PTP-aware hops separating candidate master device 308 from grand master device 310.

During this search, slave device 302 may find and/or identify those data fields in reply messages 124(3) and 124(4). For example, slave device 302 may determine that candidate master device 304 is separated from slave device 302 by six hops and/or that candidate master device 304 is one PTP-aware hop removed from grand master device 310. In this example, slave device 302 may also determine that candidate master device 308 is separated from slave device 302 by two hops and/or that candidate master device 308 is two PTP-aware hops removed from grand master device 310.

In some examples, slave device 302 may then identify and/or determine which of candidate master devices 304 and 308 is the best synchronization option based at least in part on the number of hops separating candidate master devices 304 and 308 from slave device 502. In one example, slave device 302 may select candidate master device 308 instead of candidate master device 304 due at least in part to candidate master device 308 having a lower degree of separation than candidate master device 304. Slave device 302 may then synchronize its internal clock with the internal clock of the selected master device.

In another example, candidate master device 304 may have a candidate score of seven (e.g., one step removed and six hops of separation), and candidate master device 308 may have a candidate score of four (e.g., two steps removed and two hops of separation). As a result, slave device 302 may select candidate master device 304 instead of candidate master device 308 due at least in part to candidate master device 304 having a lower candidate score than candidate master device 308. Slave device 302 may then synchronize its internal clock with the internal clock of the candidate master device 304.

In some examples, slave device 302 may switch and/or transition from synchronizing with candidate master device 304 to candidate master device 308 due at least in part to link failure 402. Additionally or alternatively, slave device 302 may switch and/or transition from synchronizing with candidate master device 308 to candidate master device 304 after link failure 402 is fixed and/or resolved such that direct communication between candidate master device 304 and PTP-unaware device 316 resumes.

Figure 11:
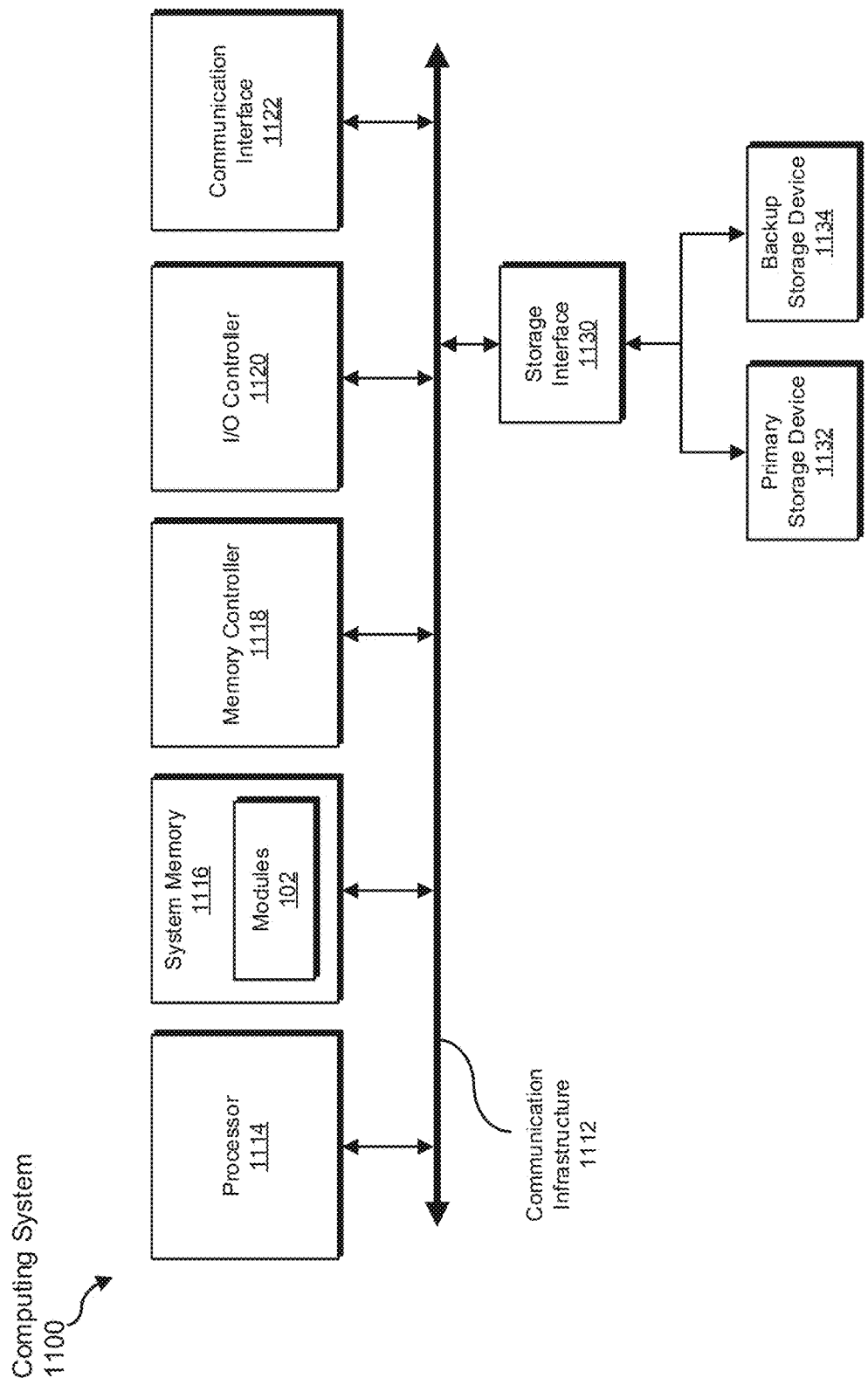
FIG. 11 is a block diagram of an exemplary computing system capable of implementing and/or being used in connection with one or more of the embodiments described and/or illustrated herein.

FIG. 11 is a block diagram of an exemplary computing system 1100 capable of implementing and/or being used in connection with one or more of the embodiments described and/or illustrated herein. In some embodiments, all or a portion of computing system 1100 may perform and/or be a means for performing, either alone or in combination with other elements, one or more of the steps described in connection with FIG. 3. All or a portion of computing system 1100 may also perform and/or be a means for performing and/or implementing any other steps, methods, or processes described and/or illustrated herein.

Computing system 1100 broadly represents any type or form of electrical load, including a single or multi-processor computing device or system capable of executing computer-readable instructions. Examples of computing system 1100 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 1100 may be programmed, configured, and/or otherwise designed to comply with one or more networking protocols. According to certain embodiments, computing system 1100 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 1100 may include a network device configured according to an Ethernet-based Layer 3 protocol.

Computing system 1100 may include various network and/or computing components. For example, computing system 1100 may include at least one processor 1114 and a system memory 1116. Processor 1114 generally represents any type or form of processing unit capable of processing data or interpreting and executing instructions. For example, processor 1114 may represent an application-specific integrated circuit (ASIC), a system on a chip (e.g., a network processor), a hardware accelerator, a general purpose processor, and/or any other suitable processing element.

Processor 1114 may process data according to one or more of the networking protocols discussed above. For example, processor 1114 may execute or implement a portion of a protocol stack, may process packets, may perform memory operations (e.g., queuing packets for later processing), may execute end-user applications, and/or may perform any other processing tasks.

System memory 1116 generally represents any type or form of volatile or non-volatile storage device or medium capable of storing data and/or other computer-readable instructions. Examples of system memory 1116 include, without limitation, Random Access Memory (RAM), Read Only Memory (ROM), flash memory, or any other suitable memory device. Although not required, in certain embodiments computing system 1100 may include both a volatile memory unit (such as, for example, system memory 1116) and a non-volatile storage device (such as, for example, primary storage device 1132, as described in detail below). System memory 1116 may be implemented as shared memory and/or distributed memory in a network device. Furthermore, system memory 1116 may store packets and/or other information used in networking operations.

In certain embodiments, exemplary computing system 1100 may also include one or more components or elements in addition to processor 1114 and system memory 1116. For example, as illustrated in FIG. 11, computing system 1100 may include a memory controller 1118, an Input/Output (I/O) controller 1120, and a communication interface 1122, each of which may be interconnected via communication infrastructure 1112. Communication infrastructure 1112 generally represents any type or form of infrastructure capable of facilitating communication between one or more components of a computing device. Examples of communication infrastructure 1112 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 1118 generally represents any type or form of device capable of handling memory or data or controlling communication between one or more components of computing system 1100. For example, in certain embodiments memory controller 1118 may control communication between processor 1114, system memory 1116, and I/O controller 1120 via communication infrastructure 1112. In some embodiments, memory controller 1118 may include a Direct Memory Access (DMA) unit that may transfer data (e.g., packets) to or from a link adapter.

I/O controller 1120 generally represents any type or form of device or module capable of coordinating and/or controlling the input and output functions of a computing device. For example, in certain embodiments I/O controller 1120 may control or facilitate transfer of data between one or more elements of computing system 1100, such as processor 1114, system memory 1116, communication interface 1122, and storage interface 1130.

Communication interface 1122 broadly represents any type or form of communication device or adapter capable of facilitating communication between exemplary computing system 1100 and one or more additional devices. For example, in certain embodiments communication interface 1122 may facilitate communication between computing system 1100 and a private or public network including additional computing systems. Examples of communication interface 1122 include, without limitation, a link adapter, a wired network interface (such as a network interface card), a wireless network interface (such as a wireless network interface card), and any other suitable interface. In at least one embodiment, communication interface 1122 may provide a direct connection to a remote server via a direct link to a network, such as the Internet. Communication interface 1122 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 1122 may also represent a host adapter configured to facilitate communication between computing system 1100 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1122 may also enable computing system 1100 to engage in distributed or remote computing. For example, communication interface 1122 may receive instructions from a remote device or send instructions to a remote device for execution.

As illustrated in FIG. 11, exemplary computing system 1100 may also include a primary storage device 1132 and/or a backup storage device 1134 coupled to communication infrastructure 1112 via a storage interface 1130. Storage devices 1132 and 1134 generally represent any type or form of storage device or medium capable of storing data and/or other computer-readable instructions. For example, storage devices 1132 and 1134 may represent a magnetic disk drive (e.g., a so-called hard drive), a solid state drive, a floppy disk drive, a magnetic tape drive, an optical disk drive, a flash drive, or the like. Storage interface 1130 generally represents any type or form of interface or device for transferring data between storage devices 1132 and 1134 and other components of computing system 1100.

In certain embodiments, storage devices 1132 and 1134 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1132 and 1134 may also include other similar structures or devices for allowing computer software, data, or other computer-readable instructions to be loaded into computing system 1100. For example, storage devices 1132 and 1134 may be configured to read and write software, data, or other computer-readable information. Storage devices 1132 and 1134 may be a part of computing system 1100 or may be separate devices accessed through other interface systems.

Many other devices or subsystems may be connected to computing system 1100. Conversely, all of the components and devices illustrated in FIG. 11 need not be present to practice the embodiments described and/or illustrated herein. The devices and subsystems referenced above may also be interconnected in different ways from those shown in FIG. 11. Computing system 1100 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
preparing, at a slave device included in a partial timing network, at least one request message that identifies an initial time-to-live value;
sending the request message to a plurality of candidate master devices included in the partial timing network;
receiving, at the slave device from one of the candidate master devices, a reply message that identifies a number of hops between the slave device and the one of the candidate master devices, the number of hops having been calculated based at least in part on the initial time-to-live value;
receiving, at the slave device from another one of the candidate master devices, another reply message that identifies another number of hops between the slave device and the another one of the candidate master devices, the another number of hops having been calculated based at least in part on the initial time-to-live value; and
synchronizing a clock of the slave device with a clock of the one of the candidate master devices due at least in part to the number of hops being less than the another number of hops.

2. The method of claim 1, further comprising, after synchronizing the clock of the slave device with the clock of the one of the candidate master devices:
preparing, at the slave device, at least one subsequent request message that identifies the initial time-to-live value;
sending the subsequent request message to the plurality of candidate master devices included in the partial timing network;
receiving, at the slave device from the one of the candidate master devices, a subsequent reply message that identifies the number of hops between the slave device and the one of the candidate master devices, the number of hops having been calculated based at least in part on the initial time-to-live value;
receiving, at the slave device from the another one of the candidate master devices, another subsequent reply message that identifies a different number of hops between the slave device and the another one of the candidate master devices, the different number of hops having been calculated based at least in part on the initial time-to-live value; and
synchronizing the clock of the slave device with a clock of the another one of the candidate master devices due at least in part to the different number of hops being less than the number of hops.

3. The method of claim 2, wherein the another number of hops between the slave device and the another one of the candidate master devices changes to the different number of hops between the slave device and the another one of the candidate master devices due at least in part to a link failure that occurs within the partial timing network.

4. The method of claim 1, wherein synchronizing the clock of the slave device with the clock of the one of the candidate master devices comprises:
comparing the number of hops and the another number of hops with one another;
determining, based at least in part on the comparison, that the number of hops is less than the another number of hops; and
in response to determining that the number of hops is less than the another number of hops, selecting the clock of the one of the candidate master devices for synchronizing the clock of the slave device.

5. The method of claim 1, wherein the reply message received from the one of the candidate master devices comprises:
a first data field that identifies the number of hops between the slave device and the one of the candidate master devices; and
a second data field that identifies a number of hops that support a certain clock-synchronization protocol between the one of the candidate master devices and a grand master device; and
further comprising:
searching the reply message received from the one of the candidate master devices for the first data field and the second data field; and
determining, based at least in part on the first data field and the second data field, that the clock of the one of the candidate master devices is a better synchronization option than a clock of the another one of the candidate master devices.

6. The method of claim 5, wherein synchronizing the clock of the slave device with the clock of the one of the candidate master devices comprises synchronizing the clock of the slave device with the clock of the one of the candidate master devices in response to determining that the clock of the one of the candidate master devices is the better synchronization option.

7. The method of claim 5, wherein the another reply message received from the another one of the candidate master devices comprises:

a third data field that identifies the another number of hops between the slave device and the another one of the candidate master devices; and a fourth data field that identifies a number of hops that support the certain clock-synchronization protocol between the another one of the candidate master devices and the grand master device; and further comprising:

searching the another reply message received from the another one of the candidate master devices for the third data field and the fourth data field; and determining that the clock of the one of the candidate master devices is the better synchronization option based at least in part on the first data field, the second data field, third data field, and the fourth data field.

8. The method of claim 7, wherein determining that the clock of the one of the candidate master devices is the better synchronization option comprises:

calculating a sum that represents the number of hops between the slave device and the one of the candidate master devices in addition to the number of hops that support the certain clock-synchronization protocol between the one of the candidate master devices and the grand master device;

calculating another sum that represents the another number of hops between the slave device and the another one of the candidate master devices in addition to the number of hops that support the certain clock-synchronization protocol between the another one of the candidate master devices and the grand master device;

comparing the sum and the another sum with one another; and determining, based at least in part on the comparison, that the clock of the one of the candidate master devices is the better synchronization option.

9. The method of claim 5, wherein:

the first data field comprises a certain number of bits within at least one octet located at an offset of forty-six within the reply message; and the second data field comprises another number of bits within at least one other octet located at an offset of sixty-one within the reply message.

10. The method of claim 1, wherein the initial time-to-live value comprises a certain number of bits within at least one octet located at an offset of four within the request message.

11. The method of claim 1, further comprising:

receiving, at the one of the candidate master devices, the request message sent by the slave device;

in response to receiving the request message:

identifying, by the one of the candidate master devices, the initial time-to-live value within the request message;

identifying, by the one of the candidate master devices, a time-to-live value that has been decremented from the initial time-to-live value by the number of hops between the slave device and the one of the candidate master devices;

calculating, by the one of the candidate master devices, the number of hops between the slave device and the one of the candidate master devices by subtracting the time-to-live value from the initial time-to-live value; and preparing the reply message to identify the number of hops between the slave device and the one of the candidate master devices as calculated by the one of the candidate master devices; and sending, by the one of the candidate master devices, the reply message to the slave device via the partial timing network.

12. A system comprising:

a message module, stored in memory at a slave device included in a partial timing network, that prepares at least one request message that identifies an initial time-to-live value;

a transmission module, stored in memory at the slave device, that sends the request message to a plurality of candidate master devices included in the partial timing network;

a receiving module, stored in memory at the slave device, that:

receives, from one of the candidate master devices, a reply message that identifies a number of hops between the slave device and the one of the candidate master devices, the number of hops having been calculated based at least in part on the initial time-to-live value;

receives, from another one of the candidate master devices, another reply message that identifies another number of hops between the slave device and the another one of the candidate master devices, the another number of hops having been calculated based at least in part on the initial time-to-live value; and a synchronization module, stored in memory at the slave device, that synchronizes a clock of the slave device with a clock of the one of the candidate master devices due at least in part to the number of hops being less than the another number of hops.

13. The system of claim 12, wherein:

the message module prepares at least one subsequent request message that identifies the initial time-to-live value;

the transmission module sends the subsequent request message to the plurality of candidate master devices included in the partial timing network;

the receiving module:

receives, from the one of the candidate master devices, a subsequent reply message that identifies the number of hops between the slave device and the one of the candidate master devices, the number of hops having been calculated based at least in part on the initial time-to-live value; and receives, from the another one of the candidate master devices, another subsequent reply message that identifies a different number of hops between the slave device and the another one of the candidate master devices, the different number of hops having been calculated based at least in part on the initial time-to-live value; and the synchronization module synchronizes the clock of the slave device with a clock of the another one of the candidate master devices due at least in part to the different number of hops being less than the number of hops.

14. The system of claim 13, wherein the another number of hops between the slave device and the another one of the candidate master devices changes to the different number of hops between the slave device and the another one of the candidate master devices due at least in part to a link failure that occurs within the partial timing network.

15. The system of claim 12, further comprising:

a determination module, stored in memory at the slave device, that:

compares the number of hops and the another number of hops with one another;

determines, based at least in part on the comparison, that the number of hops is less than the another number of hops; and a selection module, stored in memory at the slave device, that selects the clock of the one of the candidate master devices for synchronizing the clock of the slave device in response to the determination that the number of hops is less than the another number of hops.

16. The system of claim 12, wherein the reply message received from the one of the candidate master devices comprises:

a first data field that identifies the number of hops between the slave device and the one of the candidate master devices; and a second data field that identifies a number of hops that support a certain clock-synchronization protocol between the one of the candidate master devices and a grand master device; and further comprising a determination module, stored in memory at the slave device, that:

searches the reply message received from the one of the candidate master devices for the first data field and the second data field; and determines, based at least in part on the first data field and the second data field, that the clock of the one of the candidate master devices is a better synchronization option than a clock of the another one of the candidate master devices.

17. The system of claim 16, wherein the synchronization module synchronizes the clock of the slave device with the clock of the one of the candidate master devices in response to determining that the clock of the one of the candidate master devices is the better synchronization option.

18. The system of claim 16, wherein:

the another reply message received from the another one of the candidate master devices comprises:

a third data field that identifies the another number of hops between the slave device and the another one of the candidate master devices; and a fourth data field that identifies a number of hops that support the certain clock-synchronization protocol between the another one of the candidate master devices and the grand master device; and the determination module:

searches the another reply message received from the another one of the candidate master devices for the third data field and the fourth data field; and determines that the clock of the one of the candidate master devices is the better synchronization option based at least in part on the first data field, the second data field, third data field, and the fourth data field.

19. The system of claim 18, wherein the determination module:

calculates a sum that represents the number of hops between the slave device and the one of the candidate master devices in addition to the number of hops that support the certain clock-synchronization protocol between the one of the candidate master devices and the grand master device;

calculates another sum that represents the another number of hops between the slave device and the another one of the candidate master devices in addition to the number of hops that support the certain clock-synchronization protocol between the another one of the candidate master devices and the grand master device;

compares the sum and the another sum with one another; and determines, based at least in part on the comparison, that the clock of the one of the candidate master devices is the better synchronization option.

20. An apparatus comprising:

at least one storage device that stores an initial time-to-live value; and at least one physical processor communicatively coupled to the storage device, wherein the physical processor:

prepares, at a slave device included in a partial timing network, at least one request message that identifies the initial time-to-live value;

sends the request message to a plurality of candidate master devices included in the partial timing network;

receives, at the slave device from one of the candidate master devices, a reply message that identifies a number of hops between the slave device and the one of the candidate master devices, the number of hops having been calculated based at least in part on the initial time-to-live value;

receives, at the slave device from another one of the candidate master devices, another reply message that identifies another number of hops between the slave device and the another one of the candidate master devices, the another number of hops having been calculated based at least in part on the initial time-to-live value; and synchronizes a clock of the slave device with a clock of the one of the candidate master devices due at least in part to the number of hops being less than the another number of hops.

\* \* \* \* \*